United States Patent
Flegny et al.

(10) Patent No.: US 12,552,523 B2
(45) Date of Patent: Feb. 17, 2026

(54) LANDING GEAR COMPRISING STATIC SEALING POINTS

(71) Applicant: SAFRAN LANDING SYSTEMS, Velizy-Villacoublay (FR)

(72) Inventors: Anaïs Flegny, Moissy-Cramayel (FR); Sacha Mierzejewski, Moissy-Cramayel (FR); Nicolas Mathon, Moissy-Cramayel (FR)

(73) Assignee: SAFRAN LANDING SYSTEMS, Velizy-Villacoublay (FR)

( * ) Notice: Subject to any disclaimer, the term of this patent is extended or adjusted under 35 U.S.C. 154(b) by 428 days.

(21) Appl. No.: 18/549,512

(22) PCT Filed: Mar. 1, 2022

(86) PCT No.: PCT/FR2022/050364
§ 371 (c)(1),
(2) Date: Sep. 7, 2023

(87) PCT Pub. No.: WO2022/189728
PCT Pub. Date: Sep. 15, 2022

(65) Prior Publication Data
US 2024/0158072 A1   May 16, 2024

(30) Foreign Application Priority Data

Mar. 10, 2021 (FR) ..................... 2102347

(51) Int. Cl.
*B64C 25/60* (2006.01)
*C25D 3/56* (2006.01)
*C25D 5/36* (2006.01)

(52) U.S. Cl.
CPC .............. *B64C 25/60* (2013.01); *C25D 3/562* (2013.01); *C25D 5/36* (2013.01)

(58) Field of Classification Search
CPC ............ B64C 26/60; C22C 18/00; C25D 5/36
See application file for complete search history.

(56) References Cited

U.S. PATENT DOCUMENTS

| | | | |
|---|---|---|---|
| 2007/0164151 A1* | 7/2007 | Luce ...................... | F16C 29/02 244/100 R |
| 2017/0001716 A1* | 1/2017 | Mierzejewski ......... | C23C 22/05 |

FOREIGN PATENT DOCUMENTS

| | | |
|---|---|---|
| EP | 2354277 A1 | 8/2011 |
| EP | 3112262 A1 | 1/2017 |
| EP | 3112263 A1 | 1/2017 |
| EP | 3192737 A1 | 7/2017 |
| EP | 3670337 A1 | 6/2020 |
| WO | 2014125045 A1 | 8/2014 |

OTHER PUBLICATIONS

Search Report and Written Opinion issued in International Application No. PCT/FR2022/050364, issued on Sep. 15, 2022.
Search Report issued in French Application No. 21 02347, issued on Nov. 18, 2021.

* cited by examiner

*Primary Examiner* — Jophy S. Koshy
(74) *Attorney, Agent, or Firm* — Bookoff McAndrews, PLLC

(57) ABSTRACT

A landing gear wherein it includes at least one static sealing point, the static sealing point comprising a gasket made of elastically deformable material held between a portion of a first part of the landing gear and a portion of a second part of the landing gear, the first and second parts of the landing gear comprising a steel substrate coated with a zinc and nickel alloy coating, including in mass percentage of the alloy between 12% and 18% and nickel, at most 0.5% of elements other than nickel and zinc, the balance being zinc, and the roughness Ra of the surface of the portions of the first and second parts of the landing gear being less than or equal to 1.6 μm.

5 Claims, 1 Drawing Sheet

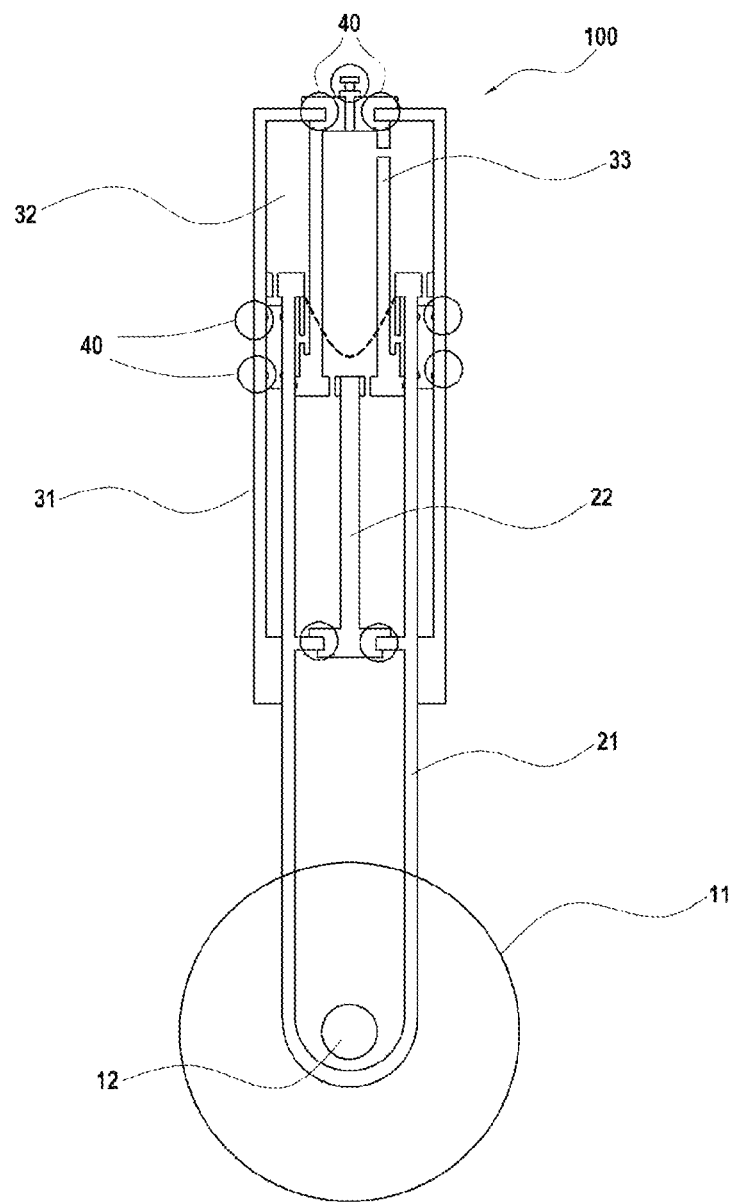

LANDING GEAR COMPRISING STATIC SEALING POINTS

CROSS-REFERENCE TO RELATED APPLICATIONS

This is a National Stage Application under 35 U.S.C. § 371 of International Application No. PCT/FR2022/050364, filed Mar. 1, 2022, now published as WO 2022/189728 A1, which claims priority to French Patent Application No. 2102347, filed on Mar. 10, 2021.

TECHNICAL FIELD

The invention relates to the field of landing gear for aircraft and more specifically to the materials thereof as well as the methods for obtaining same.

PRIOR ART

An aircraft landing gear is a member including a wheel, and allowing to support the aircraft during taxiing, take-off or landing phases. Such a landing gear generally comprises a rod that must be sufficiently rigid to support the aircraft, and is generally fitted with a damping system allowing the landing gear to accommodate the mechanical stresses exerted on the wheel during the take-off and landing steps.

Existing damping systems generally comprise a piston which moves in a chamber filled with a viscous fluid. The piston is thus slowed down in its course and therefore damped the landing gear to which it is connected.

In order to avoid any loss of fluid and to guarantee the correct operation of the damping systems, it is necessary to guarantee the sealing of the damping systems and that is why the damping systems have static sealing points.

Currently, these static sealing points comprise chromium or nickel coated substrates sandwiching gaskets made of elastically deformable material. However, the coatings currently considered do not have sufficient characteristics for other aspects essential to landing gear parts, among others good corrosion resistance, and this is why the static sealing points are today composed of several superimposed coatings to be able to guarantee a satisfactory performance assembly. This results in a complex preparation of the landing gear parts. Moreover, chromium coatings are affected by legislative changes which require their replacement in the years to come, because the use of chromium has dangers with respect to the environment and to humans.

There is therefore a need for the development of new materials suitable for the static sealing points of the landing gear which would be devoid of the disadvantages of the materials currently used.

DISCLOSURE OF THE INVENTION

In order to meet this need, the inventors propose a landing gear comprising:
- a landing gear rod extending along a main axis;
- at least one axle mechanically connected to the landing gear rod;
- at least one wheel mounted to be able to be rotated around said axle;
- at least one damper disposed to damp a sliding movement of said rod relative to a structure of the aircraft,
- the landing gear being characterized in that it further comprises at least one static sealing point, the static sealing point comprising a gasket made of elastically deformable material held between a portion of a first part of the landing gear and a portion of a second part of the landing gear, the first and second parts of the landing gear comprising a steel substrate coated with a zinc and nickel alloy coating, including in mass percentage of the alloy between 12% and 18% and nickel, not more than 0.5% of elements other than nickel and zinc, the remainder being zinc, and the roughness Ra of the surface of the portions of the first and second parts of the landing gear being less than or equal to 1.6 μm.

The inventors have found that steel sealing points with zinc and nickel alloy coatings having a surface roughness Ra as indicated above, allows to obtain static sealing points ensuring characteristics of static sealing which are at least identical, if not superior to the static sealing points of the prior art. In addition, the materials used are devoid of the disadvantages related to the use of the materials of the static gaskets of the prior art, and are in particular more respectful of the environment.

It is understood that the roughness Ra of the surface of a part must be understood as the average roughness of the surface within the meaning of standard ISO 4288. For example, this roughness can be measured by the stylus method. In this method the roughness of a surface is determined by moving a probe tip at a constant speed over the surface of a part.

Moreover, the inventors have found that, in addition to allowing the replacement of the coatings of the prior art, with chromium or nickel, the coatings of the invention made of zinc and nickel alloy allow to ensure other essential characteristics for landing gear parts. In particular, zinc and nickel alloy coatings ensure anti-corrosion properties which are comparable if not superior to those of coatings of the prior art.

The nickel content comprised between 12 and 18% ensures that the alloy is in the gamma phase which ensures that the coating has the desired properties. In addition, this crystallographic phase of the coating allows to ensure, in addition to the low roughness obtained, good anti-corrosion properties.

Thus, in addition to providing good static sealing at the point of static sealing, zinc and nickel alloy coatings allow to use more widely in the landing gear a single coating composition for several functions and thus greatly simplify landing gear manufacturing methods. It is understood that the "static" sealing means the sealing between two parts which are not movable relative to each other.

In particular, the static sealing of the at least one point of static sealing means a static sealing against gases and a static sealing against hydraulic fluids.

In one embodiment, the zinc and nickel alloy coating has a thickness comprised between 10 and 30 μm.

In one embodiment, the zinc and nickel alloy coating comprises, in mass percentage of the alloy, between 12% and 16% nickel, at most 0.5% of elements other than nickel, the remainder being zinc.

In one embodiment, the gasket made of elastically deformable material is composed of one or more materials selected from: polybutadiene, chlorinated polyethylene, chloroprene, polyethylene chlorosuflon, fluorocarbons, fluorosilicones, hydrogenated nitriles, polyacrylates, perfluoroelastomers, polyacrylates, polyurethanes, silicone and its derivatives, or else from nitrile-butadiene, ethylene-propylene, ethylene-acrylate, isobutylene copolymers and isoprene, styrene-butadiene, tetrafluoroethylene and propylene.

In addition, the shape of the gasket is not decisive for obtaining the effect described above. The gasket can thus be selected from the shapes of gaskets necessary for the proper implementation of the invention. In particular, the gasket can be round, O-ring shaped, "T" shaped, of square cross-section or else of hexagonal cross-section.

In one embodiment, the static sealing zone may further comprise one or more rings made of a more rigid material, disposed around the seal, and extending between the first and the second surface.

Such rings allow to protect the elastically deformable material when the sealing zone is subjected to high pressure differences. For example, these rings can be made of polyethylene terephthalate, nylon or else polyetheretherketone. Such rings can also ensure that even when the static sealing zone is subjected to strong pressure differences, the gasket made of elastically deformable material does not stretch into the interstices which could exist between the first and the second surface.

In one embodiment, at least one of the surfaces of the first and second parts may comprise an organo-mineral layer on the zinc and nickel alloy coating and in contact with the latter.

Such an organo-mineral layer allows to ensure an even lower roughness of the surface of the part than that obtained in the absence of the organo-mineral layer. However, such a layer is not necessary to obtain the desired static sealing characteristics, provided that the average roughness Ra of the surface of the part of the nickel-zinc alloy coating is less than or equal to 1.6 µm.

In one embodiment, only one of the surfaces of the first or second parts of the landing gear comprises an organo-mineral layer.

In one embodiment, the surfaces of the first or second parts of the landing gear comprise an organo-mineral layer.

In one embodiment, none of the surfaces of the first or second parts of the landing gear comprises an organo-mineral layer.

It is understood that an organo-mineral layer comprises an organic portion and/or a mineral portion.

In one embodiment, the organo-mineral layer can be selected from an organo-mineral layer based on silicone or an organo-mineral layer rich in aluminum.

Where appropriate, the organic portion and the mineral portion form a single layer, that is to say that the two portions are mixed within the same layer and do not appear as two distinct layers.

In one embodiment, the organo-mineral layer can comprise an organic portion comprising ethoxylated alcohols and an inorganic portion comprising a silicic acid.

In other embodiments, the organo-mineral layer can be an epoxy resin.

Other types of organo-mineral layers can also work provided that they allow to obtain the desired effect, namely to further reduce the surface roughness of the first or second part.

The organo-mineral layer may or may not incorporate a lubricant.

To facilitate its application, the organo-mineral layer can be selected from water-soluble agents or else, it can be used diluted in a solvent.

In a preferred embodiment, the organo-mineral layer is chosen to be water-soluble, and comprises an inorganic and organic component and with an integrated lubricant.

In one embodiment, the steel substrate of the first and second parts of the landing gear can be made of a steel selected from the following steels: 35NCD16, 35CD4, 35NC6, S99, S154, 25CD4S, Z8CND17-04, Z6CNU17-04, Z15CN17-03, S143, S144, S145, Z2CN18-10, Z2CN18-10/ Z3CN18-10, Z10CNT18-10, Z12CNT18-10, XES, XC18S, 17-4PH, X2CrNi 18-9, 304L, Z6CNT18, 17-7PH, DC04 or C22E/R.

According to another of its aspects, the invention also relates to a method for obtaining a part comprising a steel substrate coated with a zinc and nickel alloy coating, including in mass percentage of the alloy between 12% and 18% and nickel, at most 0.5% of elements other than nickel and zinc, the balance being zinc, the surface of which has an average roughness Ra less than or equal to 1.6 µm comprising at least the following steps:
   a step of degreasing the substrate;
   a step of preparing the substrate;
   a step of electrolytically depositing the coating by dipping the substrate in an alkaline bath comprising a nickel sulphate and a zincate.

The obtaining method described above allows to obtain coated steel parts suitable as first and/or second landing gear part for producing static sealing points as described above. In particular, it allows to obtain zinc and nickel alloy coatings having roughnesses Ra with an average surface of less than or equal to 1.6 µm.

In one embodiment, the substrate preparation step may comprise a sandblasting step.

In another embodiment, the substrate preparation step may comprise an etching step.

For example, the etching can be carried out using an aqueous solution of hydrochloric acid at 3%.

A preparation step comprising an etching is particularly preferred because it allows to obtain, as soon as the etching is finished, a very low roughness, which will facilitate obtaining a low roughness after the electrolytic deposition step.

In one embodiment, the method may further comprise, after the electrolytic deposition step, one or more finishing steps.

For example, in one embodiment, the finishing step is a mechanical polishing step.

This step allows to further reduce the surface roughness obtained for the zinc and nickel alloy coating at the end of the preparation method.

In this embodiment, the method may further comprise a passivation step after the mechanical polishing step.

Such a passivation step allows to improve the corrosion resistance properties of the alloy, without harming in any way the low roughness obtained after mechanical recovery.

In one embodiment, the method further comprises, after the electrolytic deposition step, a step of applying an organo-mineral composition to the zinc and nickel alloy coating.

For example, such an organo-mineral composition may comprise a mixture of silicic acid, lithium salt, ethoxylated alcohol with 16 to 18 carbon atoms and ammonia.

The application of an organo-mineral composition allows to further reduce the roughness of the surface, in particular when the surface roughness is not as low as desired after the electrolytic deposition step.

BRIEF DESCRIPTION OF THE DRAWINGS

FIG. 1 schematically shows a landing gear in one embodiment of the invention.

DESCRIPTION OF EMBODIMENTS

The invention is now described by way of particular embodiments and examples, which are described for illustrative purposes, and should not be construed as limiting the invention.

As described above, the invention relates to a landing gear comprising:
- a landing gear rod extending along a main axis;
- at least one axle mechanically connected to the landing gear rod;
- at least one wheel mounted to be able to be rotated around said axle;
- at least one damper disposed to damp a sliding movement of said rod relative to a structure of the aircraft,
- the landing gear being characterized in that it further comprises at least one static sealing point as described above.

Conventionally, the landing gear may comprise a plurality of static sealing points, allowing to ensure correct operation of the damper.

As indicated above, the static sealing points comprise a gasket made of elastically deformable material held between a portion of a first part of the landing gear and a portion of a second part of the landing gear, the first and second parts comprising a steel substrate coated with a zinc and nickel alloy coating, including in mass percentage of the alloy between 12% and 18% and nickel, at most 0.5% of elements other than nickel and zinc, the balance being zinc, and the roughness Ra of the surface of the portions of the first and second parts of the landing gear being less than or equal to 1.6 μm.

In one embodiment, the zinc and nickel alloy coating may cover a wider portion of the first and/or second part of the landing gear than the single point of static sealing.

For example, the alloy coating may cover the entire first and/or second part of the landing gear, in order to also take advantage of the improved corrosion resistance properties conferred by the zinc and nickel alloy coating as described above.

Thus, the preparation of a landing gear is simplified compared to the preparation of a landing gear of the prior art, because it is no longer necessary to distinguish between the coatings to be applied to obtain a static sealing point and to obtain a part with good corrosion resistance.

Reference is made to FIG. 1 which describes a landing gear in one embodiment of the invention seen in section.

In this embodiment, the landing gear 100 comprises a wheel 11 mounted on an axle 12.

The axle 12 is carried inside a U-shaped rod 21, each of the branches of the rod 21 extending into a chamber 32 formed by the outer wall 31 of the landing gear. The two arms of the rod 21 extend in the chamber 32 and parallel to the outer wall 31. The branches of the rod 21 are further secured to a tab 22 which extends parallel to the arms of the rod 21 in the center of the chamber 32.

The two branches of the rod 21 and the tab 22 are free to move in a single direction, the vertical direction in the embodiment shown.

Thus, a movement of the axle 12 causes a movement of the two branches of the rod 21 and of the tab 22 relative to the outer wall 31.

According to the principle of a conventional damper, the chamber 32 of the landing gear 100 can be filled with a liquid, the viscosity of which is chosen to damp the movements of the arms of the rod 21 or the tab 22 so that the axle and the wheel it carries have their movements damped.

In the embodiment shown, the tab 22 engages in an internal portion of the chamber 32 delimited by an internal wall 33. The internal portion delimited by the internal wall 33 is however in fluid communication with the rest of the chamber 32.

The landing gear further comprises one or more static sealing point(s) 40, also marked by circles in the FIGURE.

These sealing zones allow to ensure that the contents of the chamber 32 are not in contact with the outside.

As described above, the invention also relates to a method for obtaining a part comprising a steel substrate coated with a zinc and nickel alloy coating, including in mass percentage of the alloy, between 12% and 18% and nickel, at most 0.5% of elements other than nickel and zinc, the remainder being zinc, the surface of which has a roughness Ra less than or equal to 1.6 μm. In particular, this method allows to obtain first and/or second parts for static sealing zones as described above.

The method comprises a first step of degreasing the substrate. This step is present in order to remove any contaminants from the surface. In particular, such a step can eliminate traces of oil, grease and/or foreign body which could result from the preparation of the substrate. For example, the degreasing step can be carried out with a formulation comprising sodium metasilicate, diphosphoric acid, ethoxylated alkyl alcohol, and amines. Such a formulation is, for example, commercially available under the name Turco C-AK Aviation.

The method also comprises a second step of pickling the substrate. This step aims at activating the surface of the substrate, and thus increasing its reactivity in order to promote the deposition of the zinc and nickel alloy coating.

In one embodiment, this step can be a mechanical step. For example, the substrate pickling step can be a mechanical sandblasting step.

In another embodiment, the pickling step can be a chemical step. For example, the pickling step can be carried out by dipping a substrate part obtained after the degreasing step in a hydrochloric acid solution at 175 g/L comprising 5% of an additive, for example available under the trade name Picklane 50. Dipping can take place for 5 minutes at 20° C.

The third step of the method is the step of forming the zinc and nickel alloy coating on the surface of the pickled substrate, obtained at the end of the second step, by dipping in an electrolytic bath.

The substrate part can be immersed in an alkaline bath containing a nickel sulphate and a zincate.

An electric potential is applied between the substrate part and an electrode immersed in the electrolytic bath.

For example, the alkaline bath can be obtained by pouring into the bath a solution of sodium hydroxide and/or potassium hydroxide, nickel in the form of nickel sulphate, zinc in the form of zincate and complexing agents necessary for the complexation of zinc and nickel as amines such as diethylene triamine and organic additives such as brighteners or leveling agents.

If necessary depending on the geometry of the first part, other anodes can be used to form added tools facing zones of the first part that are difficult to access. To limit local extra thicknesses, it is also possible to dispose caches and/or current thieves facing portions of the first part. This tooling consisting of anodes, caches and current thieves allows to have a uniform thickness during deposition.

The deposition time and the current density imposed between the anodes and the first part immersed in the bath define the final thickness of the zinc-nickel layer obtained. These tooling and time and current density parameters are adjusted to achieve a predetermined final layer thickness.

An optional passivation step can be carried out after the electrolysis treatment. Such a step allows to increase the resistance to corrosion conferred by the zinc and nickel coating.

Such a step can be carried out by immersion in a bath at ambient temperature. For example, the immersion can be carried out for 60 seconds.

As indicated above, the zinc and nickel alloy coating as proposed also allows to give the substrate good corrosion resistance properties. When such corrosion resistance properties are necessary, and since this does not harm the surface roughness, it is advantageous to carry out a passivation treatment on the set of the first and/or the second part. This will allow, with a single coating, to provide both the desired corrosion resistance and static sealing properties. The coating is also more environmentally friendly than the chrome and/or nickel coatings currently offered for these two applications. Finally, obtaining a single coating with both properties makes it easier to prepare the landing gear parts.

In one embodiment, the method may further comprise a step of degassing the hydrogen occluded in the steel. For example, such a step can be performed by heating the coated part for at least 12 hours in an oven at a temperature comprised between 176° C. and 204° C. Such a step allows to evacuate the hydrogen possibly formed during the electrolysis. Indeed, the part is generally placed at the cathode during this step, and it is possible that gaseous hydrogen is released at the cathode and diffuses into the material. This step therefore allows the evacuation of this hydrogen, and thus reduces the fragility of the final part.

As described above, it is possible at the end of this method treatment to further reduce the average roughness of the surface coating by means of a mechanical recovery step or by application of an organo-mineral layer.

In a first embodiment, the method further comprises a step of finishing by mechanical recovery. This step can be carried out by means of polishing using an abrasive belt.

In another embodiment, the method further comprises a finishing step by applying an organo-mineral resin.

Such a step allows, by coating the surface with an organo-mineral resin, to reduce the roughness of the surface of the part obtained at the end of the electrolytic treatment. Indeed, the organo-mineral resin will deposit in the asperities of the surface and finally form a thin film whose surface will be less rough than the surface of the coated substrate part.

The inventors have observed that a finishing step is particularly advantageous when the substrate preparation step was carried out by sandblasting. It is in fact observed that the average roughnesses of the coated substrates, obtained at the end of the electrolysis step, are lower when the preparation step is a chemical pickling than mechanical polishing.

However, it is possible to dispense with this step, because the coating obtained at the end of the electrolysis step generally has a satisfactory roughness.

Regardless of the treatment chosen, and whether or not there is a finishing step.

The invention is now described by means of exemplary embodiments.

EXAMPLES

Example 1: Sealing Test on Control Pins

In this example, the sealing of control pins representative of the static sealing points is tested. The control pins comprise an ethylene-propylene elastomeric gasket, the gasket being an O-shaped ring, held between a first part made of 35NCD16 steel covered with a zinc and nickel alloy coating comprising 12 to 18% nickel and the remainder zinc, and a second part made of metallic substrate coated with a zinc and nickel alloy comprising 12 to 18% of nickel and the remainder zinc.

The surfaces of the parts are prepared by means of an electrolytic method similar to that of the invention described above but by adjusting the production parameters so that certain parts are obtained with average roughnesses in accordance with the invention and others with higher roughnesses.

The parts may or may not comprise finishing steps allowing to reduce the roughness of their surfaces, in particular a step of depositing an organo-metallic resin, or else a step of mechanical recovery.

The protocols for the sealing tests carried out are as follows:

for the nitrogen sealing test at 150 bars: the valve representative of the sealing zone is screwed into the sample with a torque comprised between 12 and 12.5 N·m. Then the sample is inflated by a flow of nitrogen at a pressure of 150 bar. A second valve called pressure closing valve is closed with a torque of 12 to 12.5 N·m to maintain pressure in the sealing zone to be tested.

To detect a leak, a foaming fluid is applied every day for 7 days to the pin. If foam appears, the part is declared not sealed (noted NOK in the tables below). On the contrary, if no foam is observed even after 7 days, the part is declared sealed (noted OK in the tables below).

for the hydraulic fluid sealing test at 150 bars: 1 mL of phosphorescent fluid is introduced into the reservoir of the sealing pin. The rest of the reservoir is filled with FH51 hydraulic fluid. The valve representative of the sealing zone to be tested is screwed into the sample with a torque comprised between 12 and 12.5 N·m. The sample is inflated using FH51 hydraulic fluid at a pressure of 150 bars. A second valve called pressure closing valve is closed with a torque of 12 to 12.5 N·m to pressurize the sealing zone to be tested. The part obtained is inspected every day for 21 days under ultraviolet radiation to see whether or not the phosphorescent fluid has escaped from the sealing pin. If the phosphorescent fluid appears, the part is declared not sealed (noted NOK in the tables below) while if the phosphorescent fluid does not appear, the part is declared sealed (noted OK in the tables below).

The test results for this example are shown in Table 1 below.

In the tables of the examples, the mention OK indicates that the sealing test is conclusive, while the mention NOK indicates the opposite. The—indicates that the measurement has not been performed. The zinc nickel finishing column indicates whether or not a treatment has been carried out after the electrolytic deposition of the coating.

TABLE 1

| Zinc nickel finish | Average Ra (µm) | Nitrogen sealing test 150 bar | Hydraulic fluid sealing test 150 bar |
|---|---|---|---|
| None | 2.2 | OK | OK |
| None | 3.6 | NOK | NOK |
| Organo-metallic finish | 1.5 | OK | OK |
| Mechanical recovery | 0.2 | OK | OK |

Table 1 shows that for control pins, the sealing does not depend on the presence or not of a finishing step on the coating, but that, on the other hand, when the roughness becomes too great, the sealing is no longer ensured.

Example 2: Sealing Tests on an Axis

In this example, a cylindrical steel part is coated with a zinc and nickel alloy coating. Around this cylindrical part serving as the first surface are placed two elastomeric gaskets.

The elastomeric gaskets are then covered by a second steel part, the surface of which is coated with a zinc and nickel alloy coating and two static sealing zones have thus been formed.

The surfaces of the parts are prepared by means of an electrolytic method similar to that of the invention described above but by adjusting the production parameters so that certain parts are obtained with average roughnesses in accordance with the invention and others with higher roughnesses.

The static sealing zones are then tested by applying a flow of nitrogen at 100 bar between the two sealing and immersion zones in an oil bath to visually determine whether or not the nitrogen manages to pass through the static sealing zone.

The sealing zones are deemed to be compliant if after 6 minutes, no bubbles, or only a few small-diameter bubbles are observed (noted OK in the table below).

If a few paths of bubbles of a large diameter, or many paths of large bubbles are observed, the sealing zones are deemed unsatisfactory (noted NOK in the table below).

The test is carried out for several surfaces prepared by a method similar to that of the invention optionally comprising a finishing step by mechanical polishing.

TABLE 2

| Zinc nickel finish | Average Ra (µm) | Nitrogen sealing test 100 bar |
|---|---|---|
| None | 3.3 | OK |
|  | 4.7 | NOK |
|  | 4.5 | NOK |
| Mechanical recovery | 3.3 | OK |
|  | 3.5 | OK |
|  | 2.6 | OK |

Table 2, illustrates in the case of cylindrical model parts that sealing is not related to the presence or not of a finishing step, and also demonstrates that when the roughness exceeds a limit value, sealing is no longer ensured.

Example 3: Sealing Tests on Real Parts

Static sealing zones for real landing gear parts are produced by a method as described above.

The surfaces of the parts are prepared by means of an electrolytic method similar to that of the invention described above but by adjusting the production parameters so that certain parts are obtained with average roughnesses in accordance with the invention and others with higher roughnesses.

The sealing is tested between two static sealing zones, as in example 2.

The gas-tightness of the static sealing zones is tested by subjecting the space between two static sealing zones to a nitrogen pressure of 100 bars for 10 to 12 minutes in an oil bath. If at most two lines of bubbles are detected, the part is deemed to be sealed (noted OK in the table below), and not sealed if more bubbles are detected.

The static fluid sealing is also tested by a method similar to that described in example two, but at a pressure of 172 bars for 2 minutes then 97 bars for 12 hours. If no leak is detected, the part is deemed to be sealed (noted OK in the table below), and not sealed otherwise.

The results are shown in the table below for different samples.

TABLE 3

| Zinc nickel finish | Average Ra (µm) | Nitrogen sealing test 100 bar 10 min | Hydraulic sealing test 172 bars 2 min + 97 bars 12 h |
|---|---|---|---|
| None | 0.9 | OK | OK |
| None | 1.1 | OK | OK |
| None | 1.7 | NOK | — |
| Mechanical recovery | 0.8 | OK | OK |
| Mechanical recovery | 1.0 | OK | OK |
| Mechanical recovery | 0.8 | OK | OK |

Table 3 illustrates a behavior similar to that of the control parts of examples 1 and 2, namely whether or not a part is sealed does not depend on whether or not it is finished. It is also observed that when the average surface roughness exceeds 1.6 µm, sealing is no longer ensured, whereas as long as the surface roughness remains below 1.6 µm, the static sealing zones are satisfactory.

Example 4

Static sealing zones are prepared on cylindrical landing gear rods coated with a nickel and zinc coating.

The surfaces of the parts are prepared by means of an electrolytic method similar to that of the invention described above but by adjusting the production parameters so that certain parts are obtained with average roughnesses in accordance with the invention and others with higher roughnesses.

The sealing is tested between two static sealing zones, as in example 2.

The static fluid sealing is tested by a method similar to that described in example 2, but with a pressure of 5, 12 or 150 bars. If no leak is detected, the part is deemed to be sealed (noted OK in the table below), and not sealed otherwise (noted NOK).

TABLE 4

| Zinc nickel finish | Average Ra (µm) | Hydraulic sealing test 5 bar | Hydraulic sealing test 12 bar | Hydraulic sealing test 150 bar |
|---|---|---|---|---|
| None | 0.3 | OK | OK | OK |
| None | 0.5 | OK | OK | OK |
| None | 2.0 | OK | OK | OK |

The examples described in table 4 show that the hydraulic sealing is satisfactory for real landing gear parts even when the average roughness is slightly higher.

The above examples clearly demonstrate that the parts in accordance with the object of the invention have static sealing characteristics that are superior to parts outside the invention.

The invention claimed is:
1. A landing gear comprising:
a landing gear rod extending along a main axis;

at least one axle mechanically connected to the landing gear rod;

at least one wheel mounted on said axle wherein said wheel is able to be rotated around said axle;

at least one damper disposed to damp a sliding movement of said landing gear rod relative to a structure of an aircraft;

at least one static sealing point, the static sealing point comprising a gasket made of elastically deformable material held between a portion of a first part of the landing gear and a portion of a second part of the landing gear, the first and second parts of the landing gear comprising a steel substrate coated with a zinc and nickel alloy coating, including in mass percentage of the alloy between 12% and 18% and nickel, at most 0.5% of elements other than nickel and zinc, the balance being zinc; and a roughness Ra of a surface of the portions of the first and second parts of the landing gear being less than or equal to 1.6 μm.

2. The landing gear according to claim 1, wherein the zinc and nickel alloy coating has a thickness comprised between 10 and 30 μm.

3. The landing gear according to claim 1, wherein the gasket made of elastically deformable material is composed of one or more materials selected from: polybutadiene, chlorinated polyethylene, chloroprene, polyethylene chlorosuflon, fluorocarbons, fluorosilicones, hydrogenated nitriles, polyacrylates, perfluoroelastomers, polyacrylates, polyurethanes, silicone and its derivatives, or else from nitrile-butadiene, ethylene-propylene, ethylene-acrylate, isobutylene copolymers and isoprene, styrene-butadiene, tetrafluoroethylene and propylene.

4. The landing gear according to claim 1, wherein at least one of the surfaces of the first and second parts comprises an organo-mineral layer on the zinc and nickel alloy coating and in contact with the latter.

5. The landing gear according to claim 1, wherein the steel substrate of the first and second parts is selected from the following steels: 35NCD16, 35CD4, 35NC6, S99, S154, 25CD4S, Z8CND17-04, Z6CNU17-04, Z15CN17-03, S143, S144, S145, Z2CN18-10, Z2CN18-10/Z3CN18-10, Z10CNT18-10, Z12CNT18-10, XES, XC18S, 17-4PH, X2CrNi 18-9, 304L, Z6CNT18, 17-7PH, DC04 or C22E/R.

* * * * *